США009828786B2

United States Patent
Paton et al.

(10) Patent No.: US 9,828,786 B2
(45) Date of Patent: Nov. 28, 2017

(54) MODULAR TOWER FOR A WIND POWER PLANT

(71) Applicant: THYSSENKRUPP STEEL EUROPE AG, Duisburg (DE)

(72) Inventors: Adrian Paton, Dinslaken (DE); Mark Hirt, Bochum (DE); Lothar Patberg, Moers (DE); Hasan Bagci, Duisburg (DE); Rainer Fechte-Heinen, Bottrop (DE); Stephan Drewes, Mönchengladbach (DE); Konstantinos Savvas, Oberhausen (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/417,553

(22) PCT Filed: Jul. 16, 2013

(86) PCT No.: PCT/EP2013/064997
§ 371 (c)(1),
(2) Date: Jan. 26, 2015

(87) PCT Pub. No.: WO2014/016166
PCT Pub. Date: Jan. 30, 2014

(65) Prior Publication Data
US 2015/0218840 A1    Aug. 6, 2015

(30) Foreign Application Priority Data

Jul. 25, 2012  (DE) .................. 10 2012 106 772

(51) Int. Cl.
*E04H 12/08*  (2006.01)
*E04H 12/10*  (2006.01)
(Continued)

(52) U.S. Cl.
CPC ............ *E04H 12/085* (2013.01); *E04H 12/08* (2013.01); *E04H 12/10* (2013.01); *E04H 12/342* (2013.01);
(Continued)

(58) Field of Classification Search
CPC ..... E04H 12/085; E04H 12/10; E04H 12/342; E04B 1/19; E04B 2001/2466;
(Continued)

(56) References Cited

U.S. PATENT DOCUMENTS 1,791,107 A * 2/1931 Speakman .............. E04H 12/10
403/175
2,359,583 A * 10/1944 Reiner ............................ 52/143
(Continued)

FOREIGN PATENT DOCUMENTS

CN      1867769 A    11/2006
CN    101225717 A     7/2008
(Continued)

OTHER PUBLICATIONS

Machine Translation, Shao.*
(Continued)

*Primary Examiner* — Robert Canfield
(74) *Attorney, Agent, or Firm* — thyssenkrupp North America, Inc.

(57) ABSTRACT

The invention relates to a tower of a wind power plant, having a lower part in the form of a lattice tower or truss tower with at least two corner bars, and an upper part in the form of a cross-sectionally substantially round tubular tower, wherein each particular corner bar is put together from a plurality of steel tube profiles that are connected together in the longitudinal direction. In order to achieve good transportability and easier assembly of the components of such a tower, the invention proposes a modular tower
(Continued)

concept. According to the invention, each particular corner bar is in this case put together from at least three steel tube profiles which are provided with perforated flanges for holding screws, wherein the corner bars are connected together by cross struts and/or tension struts attached to the flanges, and wherein the steel tube profiles of each particular corner bar are spirally welded steel tube profiles.

19 Claims, 5 Drawing Sheets

(51) Int. Cl.
| | | |
|---|---|---|
| *E04H 12/34* | (2006.01) | |
| *F03D 13/20* | (2016.01) | |
| *E04H 12/00* | (2006.01) | |
| *E04B 1/19* | (2006.01) | |
| *E04B 1/24* | (2006.01) | |

(52) U.S. Cl.
CPC ........ *F03D 13/20* (2016.05); *E04B 2001/193* (2013.01); *E04B 2001/1954* (2013.01); *E04B 2001/246* (2013.01); *E04B 2001/2466* (2013.01); *E04H 2012/006* (2013.01); *F05B 2240/9121* (2013.01); *Y02E 10/728* (2013.01); *Y10S 416/06* (2013.01)

(58) Field of Classification Search
CPC ......... E04B 2001/193; E04B 2001/246; E04B 2001/2415; E04B 2001/1954; F03D 11/04; F05B 2240/9121; F05B 224/912; F05B 224/9121; Y10S 416/06; E02D 27/425; E02B 2017/0091
USPC .................. 52/651.01, 651.06, 651.07, 849; 416/DIG. 6

See application file for complete search history.

(56) References Cited

U.S. PATENT DOCUMENTS

| | | | | |
|---|---|---|---|---|
| 2,611,456 | A * | 9/1952 | Bader | 52/117 |
| 3,807,120 | A * | 4/1974 | Viandon | 52/638 |
| 3,846,030 | A * | 11/1974 | Katt | 403/2 |
| 3,863,460 | A * | 2/1975 | Straile | B63B 25/12 114/74 A |
| 4,010,864 | A * | 3/1977 | Pimshtein | B01J 3/048 138/142 |
| 4,047,419 | A * | 9/1977 | Hookings | B21C 37/30 29/213.1 |
| 4,065,953 | A * | 1/1978 | Frentzen | B21C 37/30 269/48.1 |
| 4,403,916 | A * | 9/1983 | Skelskey | F03D 7/0212 416/14 |
| 4,435,125 | A * | 3/1984 | Cook | F03D 3/064 416/132 B |
| 4,557,629 | A * | 12/1985 | Meek et al. | 405/204 |
| 4,628,323 | A * | 12/1986 | Crean | 343/765 |
| 4,645,893 | A * | 2/1987 | Shimazaki | B23K 11/3036 219/62 |
| 4,818,145 | A * | 4/1989 | Carruba | 405/203 |
| 4,842,446 | A * | 6/1989 | Carruba | 405/227 |
| 4,979,453 | A * | 12/1990 | Sloan | E02B 3/064 114/263 |
| 5,122,010 | A * | 6/1992 | Burguieres et al. | 405/204 |
| 5,367,852 | A * | 11/1994 | Masuda | E04G 1/06 182/186.7 |
| 5,465,529 | A * | 11/1995 | Park | 47/40.5 |
| 5,868,223 | A * | 2/1999 | Lubinski | 182/179.1 |
| 6,499,266 | B1 | 12/2002 | Macumber | |
| 7,310,920 | B2 * | 12/2007 | Hovey, Jr. | 52/655.1 |
| 7,823,347 | B1 * | 11/2010 | Blinn | 52/244 |
| 7,993,107 | B2 * | 8/2011 | Gevers | 416/244 R |
| 8,056,298 | B2 * | 11/2011 | Haugsoen | E02B 17/027 416/DIG. 6 |
| 8,302,365 | B2 * | 11/2012 | Gee | E04H 12/34 52/117 |
| 8,458,970 | B2 * | 6/2013 | Zavitz | E04H 12/12 416/DIG. 6 |
| 8,607,508 | B2 * | 12/2013 | Foss | E02B 17/0004 52/152 |
| 9,038,348 | B1 * | 5/2015 | Fang et al. | 52/651.01 |
| 9,487,945 | B2 * | 11/2016 | Drewes | E04B 1/40 |
| 2006/0267348 | A1 | 11/2006 | Weitkamp et al. | |
| 2006/0277843 | A1 * | 12/2006 | Livingston | E04H 12/10 52/110 |
| 2007/0095008 | A1 * | 5/2007 | Arsene | F03D 13/20 52/745.04 |
| 2008/0290245 | A1 | 11/2008 | Haugsoeen et al. | |
| 2009/0165419 | A1 * | 7/2009 | Richard et al. | 52/650.2 |
| 2009/0249707 | A1 | 10/2009 | Curme | |
| 2009/0308016 | A1 * | 12/2009 | Strickland et al. | 52/636 |
| 2010/0313400 | A1 * | 12/2010 | Simmons | 29/281.1 |
| 2010/0326007 | A1 | 12/2010 | Silber | |
| 2011/0126488 | A1 * | 6/2011 | Hedinger et al. | 52/651.09 |
| 2011/0138721 | A1 * | 6/2011 | Bagepalli | E02D 27/42 52/299 |
| 2011/0179623 | A1 * | 7/2011 | Smith et al. | 29/428 |
| 2011/0314750 | A1 * | 12/2011 | Nies | E04H 12/342 52/173.1 |
| 2011/0314767 | A1 * | 12/2011 | Gee | E04H 12/34 52/745.17 |
| 2012/0023860 | A1 * | 2/2012 | Voss | 52/651.09 |
| 2012/0228060 | A1 * | 9/2012 | Rogers | 182/178.5 |
| 2014/0015255 | A1 * | 1/2014 | Schellstede | 290/55 |
| 2014/0245671 | A1 * | 9/2014 | Sritharan et al. | 52/173.1 |
| 2014/0318075 | A1 * | 10/2014 | Shuhaibar | 52/712 |
| 2015/0107181 | A1 * | 4/2015 | Larsen et al. | 52/655.1 |
| 2015/0354203 | A1 * | 12/2015 | Drewes | E04B 1/40 52/651.01 |
| 2016/0230745 | A1 * | 8/2016 | Patberg | E02B 17/0004 |
| 2017/0058549 | A1 * | 3/2017 | Stiesdal | F03D 13/22 |

FOREIGN PATENT DOCUMENTS

| | | | | |
|---|---|---|---|---|
| CN | 201649118 U | 11/2010 | | |
| CN | 102322074 A | 1/2012 | | |
| DE | 967918 C | 12/1957 | | |
| DE | 102006056274 A1 | 5/2008 | | |
| DE | 60317372 T2 | 8/2008 | | |
| DE | 10 2014 114 472 A1 * | 4/2016 | | |
| EP | 2067915 A2 | 6/2009 | | |
| FR | 2384084 A1 | 10/1978 | | |
| GB | 2476051 A | 6/2011 | | |
| JP | S5985804 U | 6/1984 | | |
| JP | H09174153 A | 7/1997 | | |
| JP | 2000129958 A | 5/2000 | | |
| JP | 2001248535 A * | 9/2001 | | F03D 13/22 |
| JP | 2008025786 A | 2/2008 | | |
| JP | 2010019040 A | 1/2010 | | |
| JP | 2013241911 A * | 12/2013 | | E02B 17/0004 |
| WO | 2005/021897 A1 | 3/2005 | | |
| WO | 2009/048955 A1 | 4/2009 | | |

OTHER PUBLICATIONS 2 page English Abstract of FR 2384084, Oct. 1978.*
English language Abstract for JP H09174153 A.
English language Abstract for JP 2010019040 A.
English language Abstract for JP 2000129958 A.
English language Abstract for JP 2008025786 A.
English language machine translation for JP S5985804 U.
German Language International Search Report for International patent application No. PCT/EP2013/064997; dated Dec. 4, 2013.
English Translation of International Search Report for International patent application No. PCT/EP2013/064997; dated Dec. 4, 2013.
English translation of abstract of FR 2384084 (A1).
English translation of abstract of DE 102006056274 (A1).
English translation of abstract of DE 60317372 (T2).

(56) References Cited

OTHER PUBLICATIONS

Machine translation of description of DE967918C.
English Language Abstract of CN101225717A.
English Language Abstract of CN102322074A.
English Language Abstract of CN1867769A.
English Language Abstract of CN201649118U.
English Language Abstract of EP2067915A2.

* cited by examiner

MODULAR TOWER FOR A WIND POWER PLANT

CROSS REFERENCE TO RELATED APPLICATIONS

This application is a U.S. National Stage Entry of International Patent Application Serial Number PCT/EP2013/064997, filed Jul. 16, 2013, which claims priority to German patent application no. 102012106772.4, filed Jul. 25, 2012.

FIELD

The invention relates to a tower of a wind power plant, having a lower part in the form of a lattice tower or truss tower with at least two corner bars, and an upper part in the form of a cross-sectionally substantially round tubular tower, wherein each particular corner bar is put together from a plurality of steel tube profiles that are connected together in the longitudinal direction.

BACKGROUND

Developments in wind energy plants to be erected inland are leading to ever higher hub heights of above 100 m in order to utilize greater and more constant wind speeds and thus to improve the efficiency of these wind energy plants. However, higher tubular towers having larger and more powerful rotors and generators require at the same time an increase in the wall thicknesses and diameters of the tower segments in order to meet the greater structural-mechanical demands that result therefrom, such as rigidity, protection against buckling and fatigue strength. However, the increase in the diameters of the tower segments also results in it no longer being possible to transport the prefabricated tubular tower segments with the conventional transversely oriented construction type on many roads on account of restrictions, for example bridge clearance heights of 4.4 m.

A possible solution, which is proposed for example in DE 603 17 372 T2 and also in WO 2009/048955 A1, is what is referred to as the longitudinally oriented construction type, in particular in the lower tower region, in the case of which the diameters of the finished tubular tower segments are ultimately more than 4.4 m. In this case, tubular tower sections are first put together from a plurality of arcuate shell segments at the construction site, i.e. at the location of the wind turbine, and the tubular (annular) tower segments produced in this way are connected to form the overall tower. In order to avoid welding at great heights, the shell segments in the tower construction known from DE 603 17 372 T2 are provided with perforated horizontal and vertical flanges which allow the shell segments to be connected by screws. However, this solution has a number of disadvantages. For example, in the case of large shell segments, deformations are to be expected on account of the dead weight of the shell segments, it being possible for said deformations to result in handling or fitting problems during assembly. On the other hand, in the event of subdivision into a large number of small shell segments, the number of screwed connections to be produced is relatively high, thereby increasing the assembly and also maintenance costs for re-tightening the screws.

In addition to wind power plants having a tubular tower and wind power plants having a lattice tower (truss tower), wind power plants having towers with a hybrid construction type, which have a lower lattice tower (truss tower) and an upper tubular tower connected thereto, are also known. DE 10 2006 056 274 A1 discloses a tower of the type mentioned at the beginning, which has a lattice tower with at least three corner bars in its lower part and a cross-sectionally round tubular tower in its upper part, wherein the upper connection region of the lower part is connected to the lower connection region of the upper part by means of a transition body in the transition region. The transition body is in this case formed in a manner of a truncated conical casing, wherein the corner bars extend into the transition region and are at least sectionally welded to the truncated conical casing in the transition region between the upper connection region of the lower part and the lower connection region of the upper part. The lattice tower has intersecting struts which connect the corner bars of the lattice tower together. The corner bars of the lattice tower are formed from standardized hollow profiles, preferably from steel tubes.

SUMMARY

The present invention is based on the object of creating a tower of the type mentioned at the beginning, which, while having good transportability of its components, affords cost-effective production and easier assembly of its components.

BRIEF DESCRIPTION OF THE DRAWINGS

The present disclosure is described in detail below with reference to the attached drawing figure, wherein.

DETAILED DESCRIPTION

Figure 1:
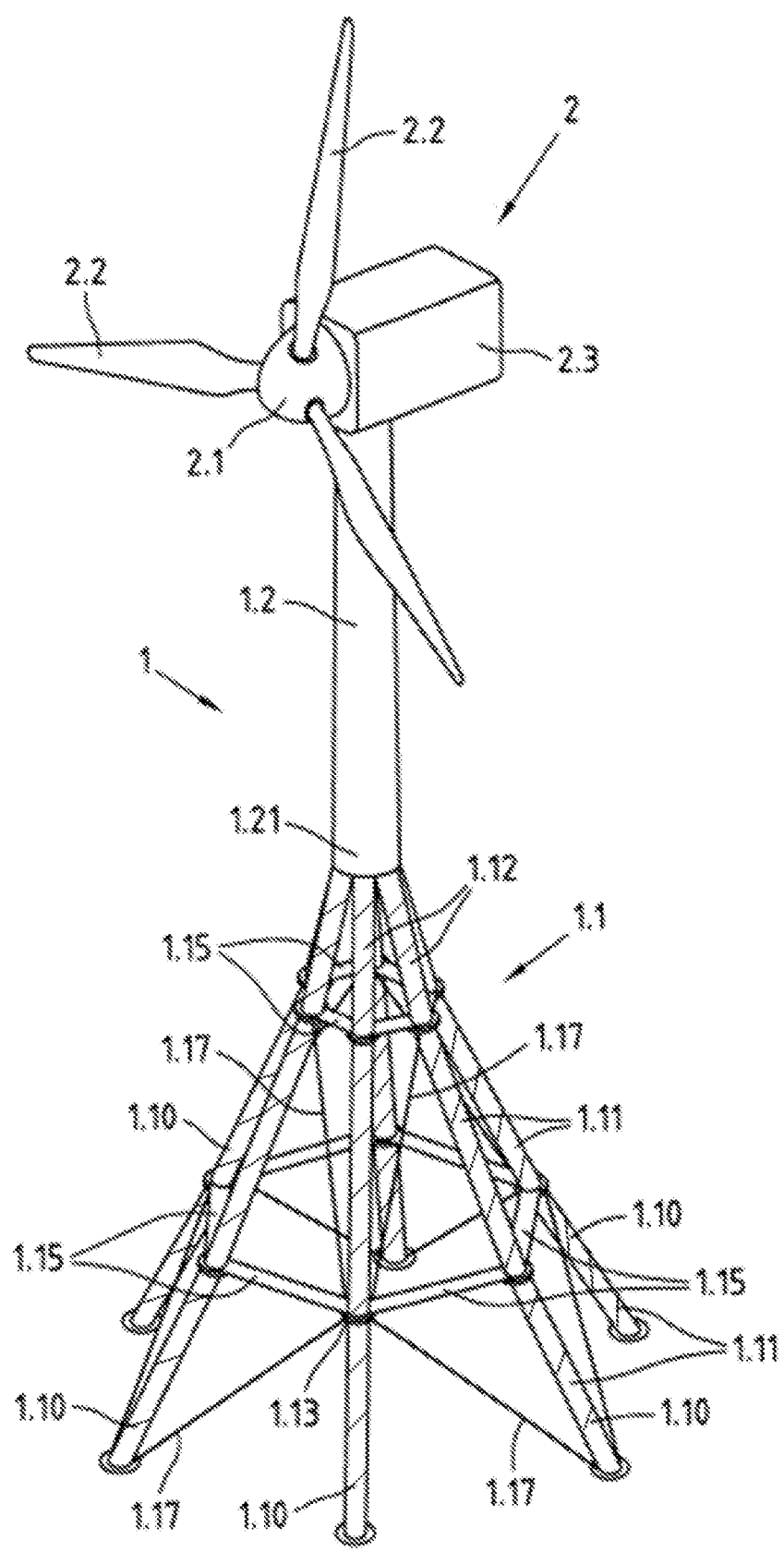
FIG. 1 is a perspective view of an embodiment of a wind power plant tower of the present disclosure.

The tower according to the invention is characterized in that each particular corner bar is put together from at least three steel tube profiles which are provided with perforated flanges for holding mechanically detachable connecting means, wherein the corner bars are connected together by cross struts and/or tension struts attached to the flanges, and wherein the steel tube profiles of each particular corner bar are spirally welded steel tube profiles.

The upper part of the tower according to the invention, which is embodied in the form of a cross-sectionally substantially round tubular tower, preferably begins from a height of 60 m. This upper part of the tower according to the invention can be realized in a conventional, transversely oriented construction type, since the diameter that meets the structural-mechanical demands should to this extent normally be beneath the limit of 4.4 m that is critical from a logistical point of view. The lower part of the tower according to the invention, which is in the form of a lattice tower or truss tower with at least two, preferably three corner bars, wherein each particular corner bar is put together according to the invention from at least three steel tube profiles that are connected together in the longitudinal direction and are provided with perforated flanges for holding mechanically detachable connecting means, simplifies the transport and assembly of the tower. Since the forces to be absorbed are distributed to a number of corner bars, the latter can be dimensioned in a considerably narrower manner than the corresponding lower part of a conventional, cross-sectionally substantially round tubular tower. The corner bars according to the invention can be handled in a much easier manner from a logistical point of view. The number of individual steel tube profiles provided with flanges can in this case be varied and is dependent on the hub height and the weight of the wind power plant, which consists substantially of a generator, gearing and rotor blades. For example, the lattice tower of the hybrid tower according to the invention can have four, five or six corner bars. The subdivision of each particular corner bar into at least three steel tube profiles which are connected together in the longitudinal direction by mechanically detachable connecting means at the flanges considerably simplifies the transport and assembly of the components of a hybrid tower for a wind power plant. The profile diameter of the steel tubes used for each particular corner bars is in this case preferably substantially identical along the overall length of the corner bar. The steel tube profile is merely cut in a different manner depending on the attachment angle to the flanges. This identical-part strategy (identical-part construction) results in reduced unit costs. Mechanically detachable connecting means should be understood in the present context as meaning, among other things, screws, bolts and lockbolts.

The steel tube profiles that are used for the corner bars of the tower according to the invention are produced by spiral welding. In difference to the production of longitudinally welded steel tube profiles, in which each tube diameter requires a particular sheet width, spiral tube production is distinguished by the fact that steel tubes having different tube diameters can be produced from one strip width or sheet width. The use of steel tube profiles produced by spiral welding is advantageous from an economic point of view. The steel sheets used in this case are preferably hot-rolled, micro-alloyed steel sheets which have an upper yield strength (ReH) of at least 355 N/mm$^2$ or 420 N/mm$^2$. The steel tube profiles (corner bars) of the tower according to the invention are particularly preferably produced from high-strength steel sheets having an upper yield strength (ReH) of for example at least 500 N/mm$^2$ or 700 N/mm$^2$. As a result, the weight of the steel tube profiles (corner bars) can be reduced, with the result that the transport and assembly are further simplified.

The wall thicknesses and diameters of the steel tube profiles are dependent in particular on the tower height and the number of corner bars. The steel tube profiles that are used for the corner bars of the tower according to the invention have for example a wall thickness in the range from 15 mm to 30 mm and an outside tube diameter in the range from 500 mm to 1800 mm, preferably in the range between 500 mm and 1200 mm.

In order to reliably absorb transverse forces that arise in the lower part of the tower, the individual corner bars are connected together by cross struts and/or tension struts attached to the flanges. The flanges of the steel tube profiles thus have a multiple attachment function; they serve to longitudinally attach the steel tube profiles forming each particular corner bar and additionally serve to transversely attach and/or diagonally attach the corner bars together, wherein each of these attachment means is executed preferably by means of screw connection. On account of this multiple attachment function, the flanges of the wind energy plant tower according to the invention can also be referred to as multi-attachment flanges.

The cross struts are preferably formed from substantially horizontally extending steel profiles. These can be for example bend pieces or rolled profiles, in particular angled struts or struts in the form of a U-profile. In addition, these cross struts are preferably formed in an identical manner in as much as they all have the same cross-sectional profile and the same cross-sectional dimensions. However, the cross struts are cut to different lengths, namely dimensioned in a shorter manner, with increasing tower height.

By way of tension struts attached to the flanges, the stability of the overall tower according to the invention can likewise be ensured or further increased. The transverse struts can in this case be embodied as steel cables, preferably pretensioned steel cables, or as bend pieces or rolled profiles. When steel cables are used as tension struts, these can be easily transported to the installation site of the tower according to the invention in the reeled state. Furthermore, tolerance problems can be ruled out with regard to the steel cables, since the steel cables can be cut to length as required at the location of the tower. In an advantageous configuration of the tower according to the invention, one or more of the diagonal struts, for example steel cables, are each provided with a tensioning device for length adaptation.

A further preferred configuration of the invention is characterized in that the connecting points or ends of the steel tube profiles are provided with flaps which have through-holes or through-bores for attaching cross struts and/or diagonal struts.

The flaps can be separately manufactured parts which are each welded to a flange at the end of the steel tube profile. Alternatively, however, the flap can also be formed in one piece with the flange. In the second case, the flap is produced for example by being formed from the steel-sheet blank that defines the flange. In both cases, the flap and the flange can be welded to the steel tube profile, wherein the flap is then oriented substantially perpendicularly to the flange.

In the case of the preferred use of bend pieces or rolled profiles as tension struts, it is possible to connect the tension struts together at their crossing point in order to further increase the stability of the overall tower according to the invention. The tension struts are in this case connected at the crossing point for example by screws or other detachable mechanical connecting means. This connection can advantageously already be carried out during the prefabrication of the tower components.

Further preferred and advantageous configurations of the wind power plant tower according to the invention are specified in the dependent claims.

The invention is explained in further detail below with reference to the attached drawing figures that illustrates a number of exemplary embodiments.

The tower 1, illustrated in the drawing, of a wind power plant 2 is constructed from a lower part 1.1 in the form of a lattice tower or truss tower and an upper part 1.2 in the form of a cross-sectionally round tubular tower.

Mounted on the upper end of the tubular tower 1.2 is a wind power plant (wind energy plant) 2 which is mounted so as to be rotatable about a substantially vertically extending axis. The wind power plant 2 comprises a rotor 2.1 having rotor blades 2.2 which are preferably rotatable about their respective longitudinal axis and are thus adjustable in an infinitely variable manner, and a generator arranged in the nacelle housing 2.3, the shaft of said generator being connected to the rotor 2.1 for conjoint rotation via a transmission and a clutch.

In the exemplary embodiment shown here, the lattice tower or truss tower 1.1 has six corner bars 1.10. However, it can also have more or fewer than six corner bars. In any case, it has at least three corner bars 1.10, their horizontal distance increases from the upper tubular tower 1.2 in the direction of the ground or foundation. The preferably substantially rectilinear corner bars 1.10 thus form a three- or more-legged tower structure, the legs of which are spread at an acute angle with respect to one another.

Each of the corner bars 1.10 is put together from at least three steel tube profiles 1.11, 1.12 which are connected together in the longitudinal direction and to this end are provided at their connecting points with perforated flanges 1.13 for holding for example screws (not shown). The flanges 1.13 are configured for example as annular flanges. Each particular flange or annular flange 1.13 has a plurality of through-holes 1.14 which are arranged in a regularly spaced apart manner on a common reference circle (cf. FIG. 2).

Preferably, the steel tube profiles 1.11, 1.12 that are used for the corner bars 1.10 are identical parts which are spirally welded. The arcuate steel sheets or steel sheets formed in a round shape which are used for the production thereof are for example hot-rolled steel sheets having a yield strength of at least 350 N/mm$^2$. However, higher-strength steel sheets can also be used to produce the steel tube profiles of the corner bars 1.10, for example steel sheets having a yield strength in the range from 500 to 700 N/mm$^2$.

The steel tube profiles 1.11, 1.12 of each particular corner bar 1.10 preferably have a wall thickness in the range from 15 mm to 30 mm. Their diameter is for example in the range from 500 mm to 1800 mm. Preferably, the steel tube profiles 1.11, 1.12 that are used for the corner bars 1.10 are produced from standard tubes.

Each particular annular flange 1.13 is preferably attached cohesively to one of the ends of the steel tube profile 1.11, 1.12 used to construct a corner bar 1.10, for example by means of fillet welding. However, a force-fitting and/or form-fitting connection between the annular flange 1.13 and the associated steel tube end for example by way of a screw connection, in the case of which the steel tube end is provided with an external thread and the annular flange with a corresponding internal thread, is also possible.

Each particular annular flange 1.13 is arranged in a horizontal plane. To this end, the ends, provided with the annular flanges 1.13, of the steel tube profiles 1.11, 1.12 are cut obliquely such that each particular cut end of the steel tube profile 1.11, 1.12 ends in a substantially horizontal manner in the fully assembled state of the lattice tower or truss tower 1.1. Those having ordinary skill in the art will recognize that in some examples, such as that shown in FIG. 1, for instance, the corner bars 1.10 of the lower part 1.1 may have a tee-pee-like configuration. Indeed, in some examples the corner bars 1.10 of the lower part 1.1 may converge at the upper part 1.2. Furthermore, it should be understood that longitudinal axes of the corner bars 1.10 may in some cases be disposed at acute angles relative to one another continuously between a ground level and the upper part 1.2, as also shown in FIG. 1, for example.

The corner bars 1.10 are connected together by cross struts 1.15. To this end, use is made of the same annular flanges 1.13 which connect the steel tubes 1.11, 1.12, preferably standard tubes, together.

The cross struts 1.15 are formed from steel profiles and extend substantially horizontally. Those cross struts 1.15 which are arranged at the same height are embodied as identical parts. The length of the cross struts 1.15 depends in this case on their attachment height. With increasing tower height, the length of the cross struts 1.15 attached to the annular flanges 1.13 decreases.

The tower 1 according to the invention, at least the lower lattice tower part 1.1 thereof, thus has a modular structure, using standardized steel profiles 1.11, 1.12, 1.15.

Figure 2:
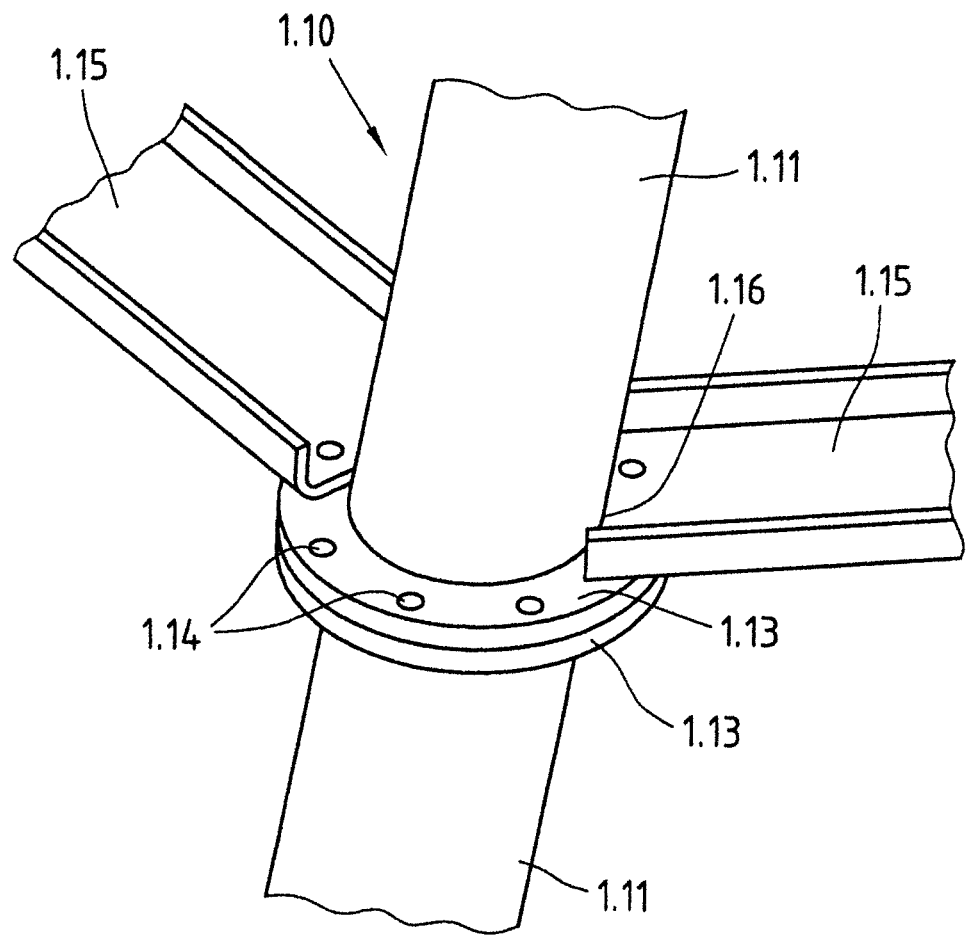
FIG. 2 is a detail perspective view of an embodiment of a lower part of the tower of FIG. 1.

The cross struts 1.15 are embodied for example as U-profiles (cf. FIG. 2). However, they can also have some other profile shape, for example an L-profile or T-profile.

The ends of each particular cross strut 1.15 preferably have end sides 1.16 that are formed in a concave or dovetail manner or are polygonally indented. As a result, the bearing surface or contact surface between the cross strut 1.15 and annular flange 1.13 can be enlarged (cf. FIG. 2).

In order to ensure or further increase the required stability of the overall tower 1, provision can be made of additional tension struts 1.17 which are fastened in each case in the flange region such that they extend diagonally in the truss which is defined by two adjacent corner bars 1.10 and two cross struts 1.15 extending substantially parallel to one another.

The tension struts 1.17 are formed for example from wire cables. The ends of the wire cables 1.17 are fastened to the through-openings 1.14 in the annular flanges 1.13 via suitable fastening means. For the length adaptation thereof, the tension struts or wire cables 1.17 can each be provided with a tensioning device (not shown). The tension struts or wire cables 1.17 and the bolts are not illustrated in FIG. 2 for the sake of clarity.

The upper tower part 1.2, which is configured as a cross-sectionally round tubular tower, starts from a height of for example about 60 m. It can be embodied in a conventional, transversely oriented construction type and accordingly be put together from a plurality of annular tube segments.

The tubular tower 1.2 of the tower 1 according to the invention is preferably embodied as a conical steel tube tower. Alternatively, however, it can also be embodied as a cylindrical steel tube tower.

At its end facing the truss tower or lattice tower 1.1, the tubular tower 1.2 has a conical or truncated conical-casing-shaped longitudinal section. The upper ends of the corner bars 1.10 are attached to this lower section 1.21 of the tubular tower 1.2. The upper steel tubes 1.12 of the corner bars 1.10 can in this case extend into the truncated conical-casing-shaped or conical longitudinal section 1.21 of the tubular tower 1.2 and are then connected to the inner side of the tubular tower 12, for example welded thereto. However, at its lower end, the tubular tower 1.2 can also have a circular-disc-shaped or annular-disc-shaped connecting plate (not shown) having a plurality of fastening holes at which the upper steel tubes 1.12 of the corner bars 1.10 are attached or screwed via annular flanges fastened thereto.

The height of the overall tower 1 put together from the lattice tower 1.1 and the tubular tower 1.2, or the hub height of the rotor 2.1 is for example about 110 m.

Figure 3:
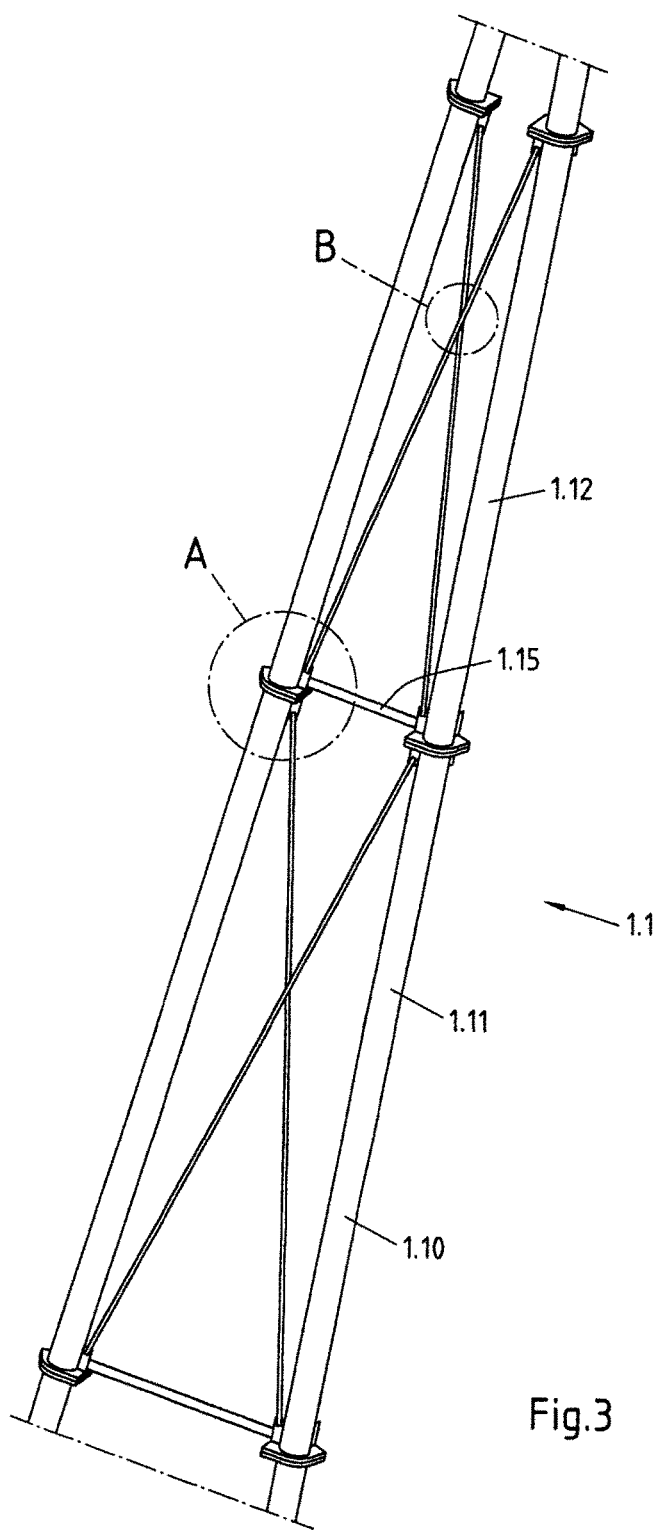
FIG. 3 is a detail perspective view of an embodiment of a lower section of a lattice tower or truss tower of a wind power plant of the present disclosure.

FIG. 3 illustrates a further exemplary embodiment of the lower part 1.1, configured as a lattice tower or truss tower, of a wind power plant tower according to the invention. The upper part of the tower, which, in a similar manner to in FIG. 1, is formed from a cross-sectionally substantially round tubular tower, is not shown in FIG. 3.

In this exemplary embodiment, the lattice tower or truss tower 1.1 has at least two corner bars 1.10 which are each put together from at least three steel tube profiles 1.11, 1.12 that are connected together in the longitudinal direction. To this end, the steel tube profiles 1.11, 1.12 are provided at their connecting points with perforated flanges 1.13 for holding detachable mechanical connecting means, for example screws. Each of the flanges 1.13 according to FIG. 4 has a plurality of through-holes 1.14 for holding the connecting means.

Furthermore, flaps 1.18 are provided at the connecting points or ends of the steel tube profiles 1.11, 1.12. The flap 1.18 and the flange 1.13 are welded to the steel tube profile 1.11 and 1.12, wherein the flap 1.18 is oriented substantially perpendicularly to the flange 1.13.

Figure 4:
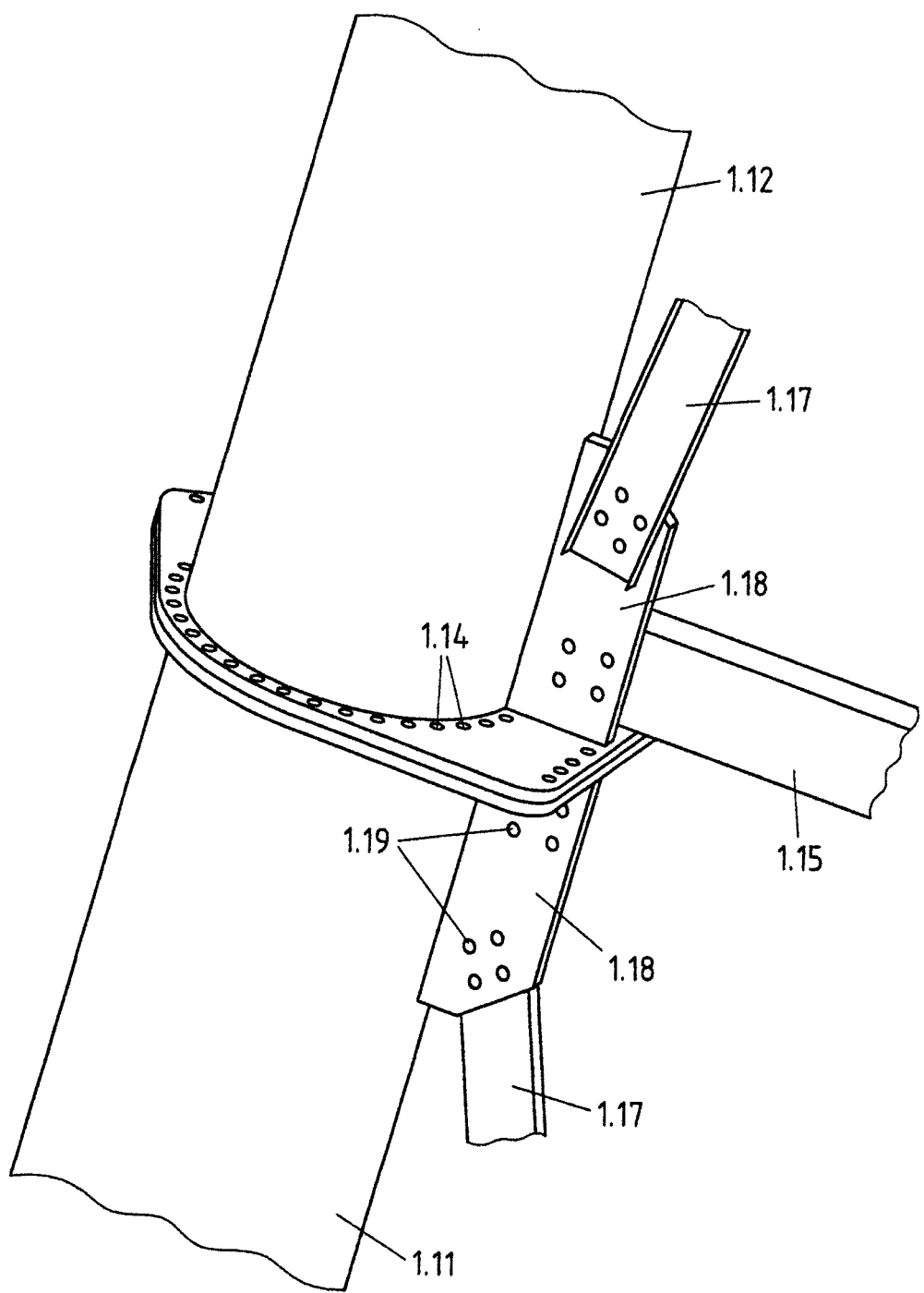
FIG. 4 is a detail perspective view of detail A as identified in the lattice tower or truss tower of FIG. 3.
Figure 5:
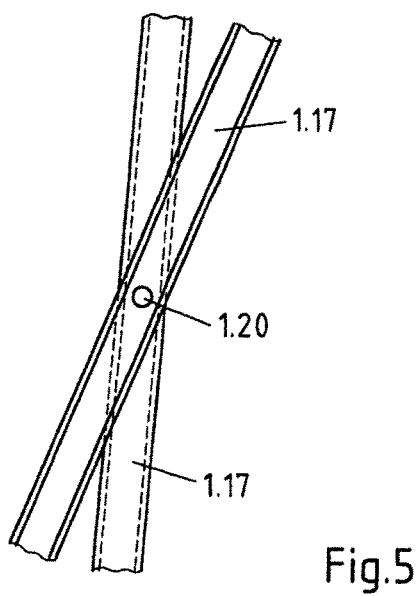
FIG. 5 is a detail perspective view of detail B as identified in the lattice tower or truss tower of FIG. 3.
Figure 6:
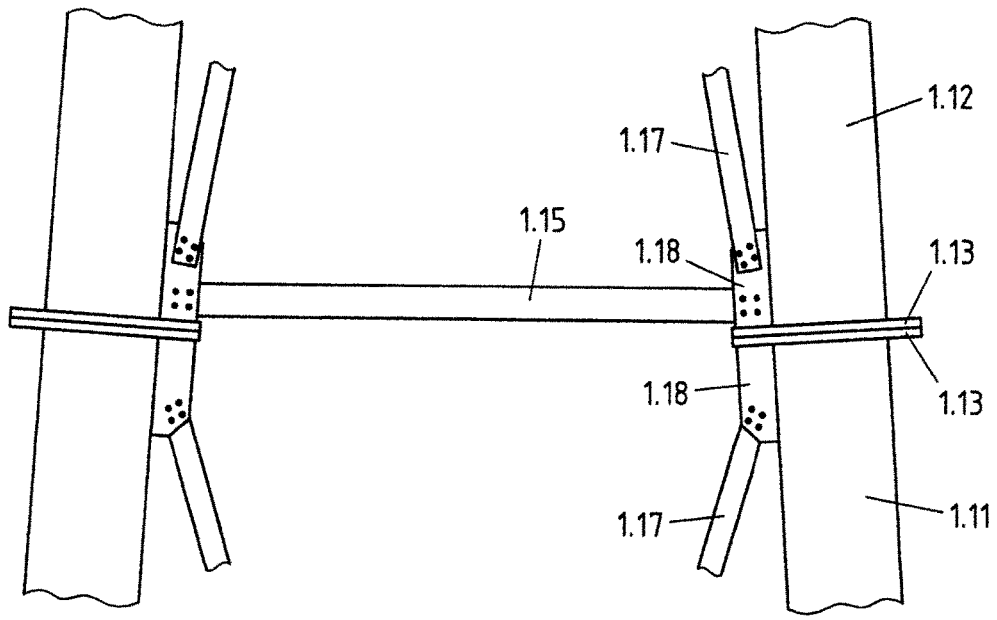
FIG. 6 is a front view of a section of the lattice tower or truss tower of FIG. 3 in the region of the connection of the steel tube profiles of two corner bars.

If the flap 1.18 is manufactured as a separate part, it is preferably also welded to the flange 1.13 (cf. FIG. 4). However, it is also within the scope of the invention to form the flap 1.18 and the flange 1.13 together in one piece. In this case, the flap 1.18 would be produced for example by being formed from the steel-sheet blank that defines the flange 1.13.

Each particular flap 1.18 likewise has a plurality of through-holes 1.19 for holding detachable mechanical connecting means. The flaps 1.18 serve for attaching tension struts 1.17. Furthermore, cross struts 1.15 can also be attached to the flaps 1.18. Alternatively or in addition, the cross struts 1.15 can also be attached to the flanges 1.13, however.

The exemplary embodiment according to FIGS. 3 and 4 affords the possibility of cutting the ends of the steel tube profiles 1.11, 1.12 to length substantially perpendicularly (at right angles) to the longitudinal axis, i.e. chamfering of the tube ends—as illustrated in FIG. 2—is not provided here. The attachment of the cross struts 1.15 to the steel tube profiles 1.11, 1.12 is then possible, in spite of their substantially right-angled cut ends or the substantially perpendicular orientation of the flanges 1.13 with respect to the steel tube profile longitudinal axis, without bending the ends of the cross struts 1.15, since the latter are in this case attached to the flaps 1.18. The flaps 1.18 thus make it possible to compensate the attachment angle between the cross strut 1.15 and the steel tube profile longitudinal axis at any desired inclination angles of the steel tube profile longitudinal axis (corner bar longitudinal axis).

The tension struts 1.17, which are embodied as bend pieces or rolled profiles in the exemplary embodiment according to FIGS. 3 to 6, are preferably connected together in their intersecting region 1.20. In order to connect or fix the tension struts 1.17 in the intersecting region 1.20, mechanical detachable connecting means, for example screws are again used. The connection or pre-fixing of the tension struts 1.17 in the intersecting region 1.20 can already take place during prefabrication of the tension struts 1.17, with the result that the assembly of the lattice tower or truss tower 1.1 at the installation site of the tower according to the invention is simplified or shortened.

The embodiment of the tower according to the invention is not limited to the exemplary embodiments illustrated in the drawing. Rather, numerous variants are conceivable which, even in the case of a configuration that deviates from the exemplary embodiment shown, make use of the invention specified in the accompanying claims. Thus, for example instead of steel cables 1.17, it is also possible for steel profile bars, for example L-profile-shaped bend pieces, to be attached as tension struts to the flanges 1.13 of the corner bar tubes 1.11, 1.12.

The invention claimed is:

1. A tower for a wind power plant, the tower comprising: a lower part having,
    at least a first corner bar, a second corner bar, and a third corner bar, each corner bar comprising at least a plurality of spirally welded steel tubes that are coupled one-to-another in an end-to-end series in a substantially longitudinal direction thereof,
    at least one perforated flange coupled to at least one end of each of the plurality of spirally welded steel tubes and configured to permit a plurality of fasteners to be mounted thereto;
    at least one of a cross strut or tension strut coupled to the first and second corner bars, each cross strut or tension strut having a first end coupled to one of the at least one perforated flange of said first corner bar, and a second end coupled to one of the at least one perforated flange of said second corner bar, such that said lower part forms a truss tower; and
    an upper part coupled to said lower part and configured as a substantially round tubular tower extending longitudinally upward from and centered above said lower part.

2. The tower of claim 1, wherein the at least one perforated flange coupled to the at least one end of each of the plurality of spirally welded steel tubes is an annular flange disposed in a substantially horizontal plane.

3. The tower of claim 2, wherein each end of the plurality of spirally welded steel tubes that is respectively coupled to one of the annular flanges is cut obliquely relative to the longitudinal direction of each of the plurality of spirally welded steel tubes, and wherein when said tower is fully assembled, each cut end and coupled annular flange is substantially horizontal.

4. The tower of claim 1, wherein the at least one perforated flange is integrally connected to the at least one end of each of the plurality of spirally welded steel tubes.

5. The tower of claim 1, wherein the lower part defines at least a first height section, and a second height section disposed above the first height section, wherein the plurality of spirally welded steel tubes that form the first height section are identical to the plurality of spirally welded steel tubes that form the second height section.

6. The tower of claim 1, wherein said at least one of a cross strut or tension strut is a substantially horizontal extending steel strut.

7. The tower of claim 6, wherein said horizontal extending steel struts are identical to each other.

8. The tower of claim 1, wherein said cross struts have ends that are at least one of concave in shape, have dovetail features, or are polygonally indented.

9. The tower of claim 1, wherein said tension struts are diagonally extending wire cables.

10. The tower of claim 1, wherein said tension struts comprise pretensioned steel cables.

11. The tower of claim 1, wherein the plurality of spirally welded steel tubes have a wall thickness between 15 mm to 30 mm.

12. The tower of claim 1, wherein the plurality of spirally welded steel tubes have a diameter between 500 mm to 1800 mm.

13. The tower of claim 1, wherein said tubular tower upper part is one of a conical steel tube tower, or a cylindrical steel tube tower.

14. The tower of claim 1, wherein said tubular tower has a conical or truncated conical-casing-shaped longitudinal section at an end facing said lower part.

15. The tower of claim 1 wherein the first, second, and third corner bars are spread at acute angles with respect to one another.

16. The tower of claim 15 wherein the first, second, and third corner bars are spread at the acute angles with respect to one another such that horizontal distances between the first, second, and third corner bars are larger at a ground level than horizontal distances between the first, second, and third corner bars at the upper part.

17. The tower of claim 15 wherein longitudinal axes of the first, second, and third corner bars are disposed at acute angles relative to one another continuously between a ground level and the upper part.

18. The tower of claim 15 wherein the first, second, and third corner bars converge at the upper part.

19. The tower of claim 15 wherein the first, second, and third corner bars of the lower part have a tee-pee-like configuration.

\* \* \* \* \*